Figure 2:
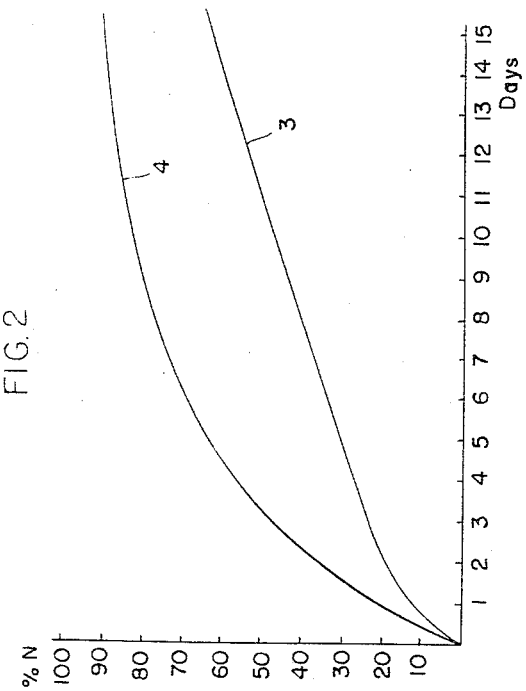

INVENTORS:
OTTHEINRICH DETMER
HERBERT MUELLER
HUBERTUS SEIBT
JOHANN JUNG

BY

ATT'YS

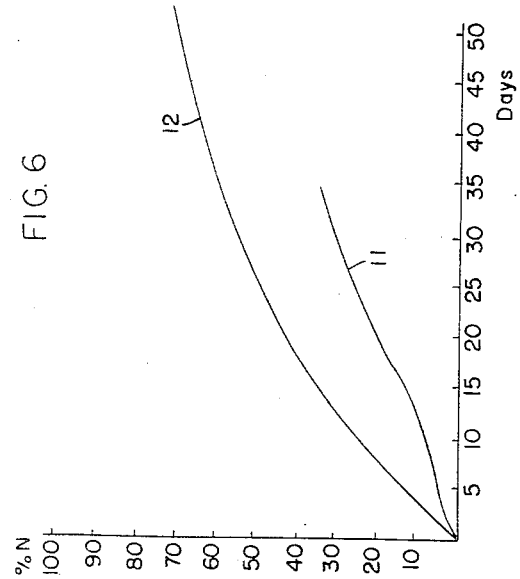
FIG. 5
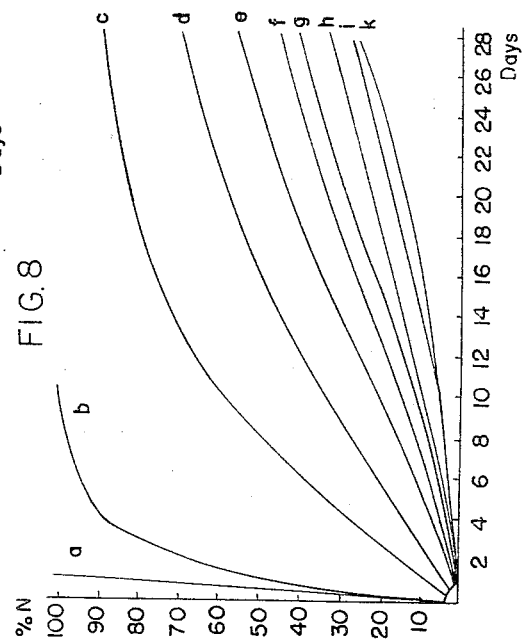
FIG. 6 / FIG. 8
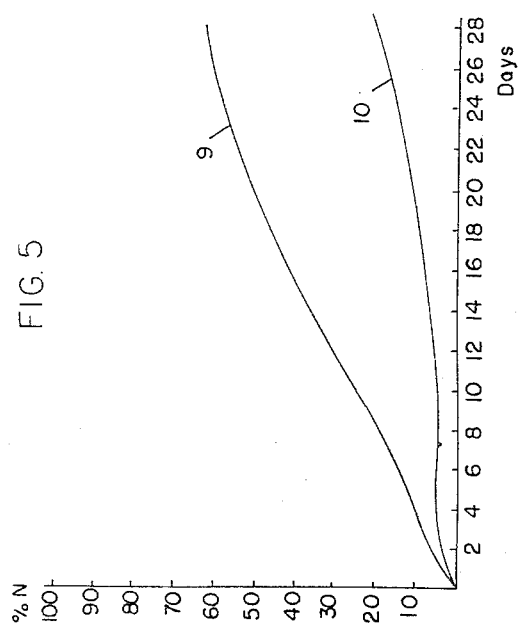
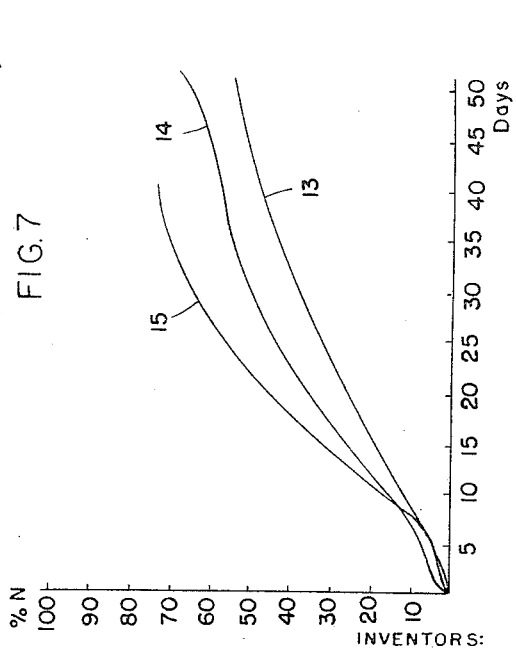
FIG. 7
INVENTORS:
OTTHEINRICH DETMER
HERBERT MUELLER
HUBERTUS SEIBT
JOHANN JUNG
BY
ATT'YS

United States Patent Office 3,365,288
Patented Jan. 23, 1968

3,365,288
METHOD OF PREPARING POLYMER COATED FERTILIZER PARTICLES FROM A SOLVENT FREE SYSTEM AND PRODUCT
Ottheinrich Detmer, Mannheim, Herbert Mueller, Frankenthal, Pfalz, Hubertus Seibt, Ludwigshafen (Rhine), and Johann Jung, Limburgerhof, Pfalz, Germany, assignors to Badische Anilin- & Soda-Fabrik Aktiengesellschaft, Ludwigshafen (Rhine), Germany
Filed Feb. 26, 1964, Ser. No. 350,140
14 Claims. (Cl. 71—64)

This invention relates to slow acting fertilizers and their production by coating fertilizers with drying oils and then drying the coatings.

Conventional fertilizers, particularly the mineral fertilizers mainly used, are in general soluble in water. This means that they are leached through the soil more or less rapidly and are consequently partly lost as plant nutrients, and on the other hand that they can damage the plants in high concentrations.

To obviate these disadvantages slow-acting synthetic fertilizers have recently been developed which contain the plant nutrients combined chemically in such a way that they are set free only by a hydrolysis reaction. Examples of substances of this type are urea-formaldehyde polycondensates or crotonylidenediurea. Inorganic salts having poor solubility, such as magnesium-ammonium phosphates or potassium polyphosphate, serve the same purpose.

It has also been known for a long time that slow-acting fertilizers are obtained when the readily water-soluble fertilizer granules are provided with a protective coating which counteracts dissolution of the fertilizer by the water in the soil.

Thus it has already been proposed to coat readily water-soluble fertilizer salts with calcium compounds of silicic or resinic acids, with softenable bituminous coals, asphalt, ozokerite, tar pitch, paraffin wax, ceresin or vegetable resins, with high boiling point tar oils or petroleum distillation residues.

Plastics have also been used more recently for coating fertilizers.

The use of polymers of styrene, vinyl chloride, vinylidene chloride, acrylonitrile, ethylene and also of fluorinated alkanes has been proposed in British Patent No. 815,829. This method is troublesome, however, because the fertilizer granules have to be pretreated with gypsum.

British Patent No. 908,493 discloses the use of polyoxyalkylenes or polysiloxanes in organic solution for coating fertilizers for the purpose of retarding the delivery of nutrient substance.

Finally it is recommended in French Patent No. 1,270,910 to provide granulated fertilizers with two or more coatings of different types. The substances forming the coatings are applied as solutions in organic solvents. Pretreatment of the fertilizer granules is also necessary in this case. Prior to being coated with a water-resistant layer, they are treated with a substance which is acid-resistant and adheres well to the granules. This treatment of the fertilizer retards the release of water-soluble component so that about 40 to 60% by weight of the nutrient substance has been delivered after four days. This value is however still unsatisfactory. A great variety of high molecular weight compounds has been proposed for the purpose of coating, as for example alkyd resins, polymethacrylates, formaldehyde-melamine polycondensates, copolymers of vinyl chloride and vinylidene chloride, drying oils, such as linseed oil, and oils based on butylene, dicyclopentadiene and butadiene.

According to the process of French Patent No. 1,270,910, a pretreatment of the fertilizer is necessary in every case prior to the application of the actual water-resistant coating. This is troublesome.

The object of this invention is to provide fertilizers having very greatly retarded nutrient delivery by direct coating of the fertilizer with readily accessible polymers, i.e. without the necessity for a pretreatment of the fertilizer or for the application of a priming layer and without the use of solvents for the polymer.

This object can be achieved by coating the fertilizer with 2 to 20% by weight of a drying oily polyene polymer and drying and hardening the coating.

According to the present invention the said object can also be achieved particularly well by coating the fertilizer with 2 to 20% by weight of a drying polyene polymer which has been rendered reactive and then drying or hardening the coating.

Drying oily polyene polymers which are suitable for the process according to this invention are obtained for example by polymerization of dienes and/or trienes, such as isoprene, piperylene, cyclopentadiene, cyclohexadiene-1,3,3-methylheptatriene-1,4,6, n-decatriene-1,5,9, or preferably butadiene, or by copolymerization of one or more polyenes with up to 50% by weight of one or more copolymerizable compounds, such as ethylene, propylene, butylene, isobutylene, vinylacetylene and preferably styrene, $\alpha$-methylstyrene and acrylonitrile. The copolymers may be statistical copolymers, graft copolymers, block copolymers and mixtures thereof. (For nomenclature see: R. J. Ceresa, Block and Graft Copolymers, Butterworth, London, 1962.)

Examples of very suitable materials are polybutadiene and copolymers obtained by polymerizing a mixture of butadiene and styrene and containing more than 20% by weight of butadiene in polymerized form. Block copolymers obtained by polymerizing a mixture containing $\alpha$-methylstyrene and more than 20% by weight, based on the mixture, of butadiene, are particularly suitable.

The polymers and copolymers may be prepared by conventional methods.

For example the polyene polymers may be prepared by polymerization of polyenes with titanium tetrachloride and trialkylaluminum. Suitable oily polybutadienes are obtained particularly advantageously by polymerizing butadiene at pressures up to 10 atmospheres with catalysts which contain compounds of zerovalent nickel at from 0° to 90° C. in the presence of inert solvents.

Suitable oily block copolymers which contain butadiene and $\alpha$-methylstyrene may be prepared advantageously with alkali metals as catalysts by the process according to U.S. Patent 3,070,574, in which they are referred to as linear graft copolymers according to an earlier nomenclature.

No protection is sought for the production of the polymers and copolymers within the scope of the present application.

The oily polyene polymers to be used in accordance with this invention may contain up to 50% by weight of other polymers incapable of further polymerization, such as polystyrene or polyacrylonitrile. Moreover the polyene polymers may have polymerizable monomeric compounds, such as styrene or acrylonitrile, added to them before or during the coating process.

The mean molecular weight of the polyene polymers to be used according to this invention is generally from 500 to 40,000, determined according to Ueberreiter, "Makromolekulare Chemie," 8 (1952), 21–28. It is possible however to use products having lower molecular weights provided the higher vapor pressure, i.e. the high combustibility or explosiveness of the gas atmosphere, over the material is not inconvenient. Polyene polymers having molecular weights of more than 40,000 may also be used, if higher viscosities are acceptable.

In a preferred embodiment of the invention, the polyene polymers and copolymers used for coating the fertilizers are subjected to a treatment which makes them so reactive that they dry in a short time.

For example, the oily polyene polymers and copolymers may be isomerized at elevated temperature in the presence of a small amount of one or more metals of groups VIB, VIIB and VIII of the Periodic System of Elements (Handbook of Chemistry and Physics, 38th edition, Chemical Rubber Publishing Co., Cleveland, Ohio, pp. 394 and 395), such as chromium, molybdenum, tungsten, manganese, iron, cobalt, nickel, palladium or platinum, and/or compounds in which one or more of these metals are present in zerovalent condition, such as nickel (0)-bis-cyclooctadiene-(1,5), chromium hexacarbonyl, cobalt carbonyl hydride or iron pentacarbonyl. This treatment probably causes a shift of the double bonds in the oily polyene polymers. In this way the polyene polymers are made more readily susceptible to crosslinking reactions and reaction with oxygen. In this way such oily polyene polymers may be cured particularly rapidly. The curing times are about five to fifteen times shorter than in the case of polyene polymers which have not been isomerized.

Another pretreatment by which the polyene polymers may be made reactive is by passing air or oxygen through them, if desired while heating and/or with the addition of compounds of the transition metals or metals having a density of more than 4.

The polyene polymers and copolymers may also very well be made reactive during or after addition of the same to the fertilizers. In this case also, transition metals or metals having a density of more than 4 or compounds of these metals are used as catalysts, examples being iron carbonyls, elementary copper, manganese salts, lead compounds, for example tetraethyllead, cobalt and nickel salts as for example cobalt naphthenate, cobalt stearate, nickel acetylacetonate and the like.

The drying period of the coatings may be further shortened by adding 0.1 to 5% of catalysts and/or driers and/or accelerators before, during or after the coating of the fertilizers. Suitable compounds are those forming free radicals, such as peroxides, azo compounds or compounds of metals having a density of more than 4, if desired in association with peroxides. Transition metal compounds are also suitable. The additoin of lead, manganese or zinc salts of resin acids is favorable. An addtiion of cobalt naphthenate which causes a rapid cure even in the case of polyene polymers which have not been made reactive gives particularly good results. The combination of cobalt naphthenate with amines, for example with dimethylaniline, is very favorable.

Examples of fertilizers whose nutrient delivery may be retarded by coating with polyene polymers are inorganic salts or salt mixtures which contain alkali metals, alkaline earth metals or ammonium as cations, phosphates, nitrates, chlorides, sulfates or carbonates as anions, or urea, derivatives of urea or urea salts. The fertilizers may also contain a proportion of transition metals or metals having a density of more than 4, for example copper, manganese, zinc or salts of such metals. The fertilizer to be coated may however be wholly or partly of vegetable or animal origin.

In order to coat the fertilizer, which is generally in granular or particulate form, with the oily polyene polymers, use may be made of equipment conventionally available in fertilizer manufacturing plant, such as stirring units, fluidized bed apparatus, oscillating channels, shaker screens, screw conveyors, pug mills and prilling towers, and particularly revolving drums with or without flights. The oily polyene polymers may be applied in a particularly simple way as a jet of liquid, in the form of fine droplets or as aerosols.

The working temperature may be room temperature or elevated temperature up to 300° C., preferably 50° to 160° C. It is recommendable to produce the elevated temperature in the equipment by means of a stream of hot air because then the amount of oxygen required for drying is supplied at the same time.

The optimum amount of polyene polymer to be used depends on the composition of the coating agent and may be determined by preliminary experiment. The coating agent may be applied all at once or in portions. When a further portion is added after the previous portion has set on the granule, a particularly good depot action of the coated fertilizer is achieved.

Fertilizers which have a uniform polymer coating and whose dissolution in water is considerably retarded, and which influence plant growth very favorably by reason of the retarded delivery of nutrient are obtained in all cases by the process according to this invention. The improved depot action may be seen for example from the following figures: a fertilizer prepared according to French Patent No. 1,270,910 and which has been coated with 5% by weight of an alkyd-phenol-formaldehyde resin delivers 50 to 60% by weight of its nutrients in forty-eight hours. A product coated with 5% by weight of a copolymer of butadiene and styrene loses only 19% by weight of its nutrients under the same conditions. A product coated with 5% by weight of oily polybutadiene isomerized by the above-mentioned methods loses only 5 to 6% by weight of its nutrients under the same conditions.

The following are further advantages of the new process: the use of organic solvents is avoided and troublesome recovery of organic solvents is therefore unnecessary. Since water is not used as a solvent or suspension agent, there is no risk that the readily water-soluble fertilizer granules will be superficially dissolved. The use of lipophilic, hydrophobic or other priming layers is not necessary because the oily polyene polymers penetrate into the capillaries of the fertilizer granules and excellent adherence of the coating to the granules can therefore be achieved. The coated fertilizer may be prepared in a single operation and a single apparatus. Although a single coating is adequate, more than one coating may be applied during one passage through the apparatus by adding definite portions of the total amount of polyene polymers to be applied at successive points in the apparatus. Such a continuous multiple coating method is particularly time-saving and economical.

Determination of the nutrient delivery in water of the coated fertilizers prepared according to the following examples is carried out as follows:

20 g. of a product is placed together with 500 ml. of water in a measuring flask and kept at 20° C. while being shaken continually. At definite time intervals, 50 ml. of the solution surrounding the granules is withdrawn and the sample analyzed; at the same time 50 ml. of water is added to the flask. The total number of analytical values is represented as a function of time. In the case of a multinutrient fertilizer, it is sufficient to determine nitrogen. Potassium and water-soluble phosphate are delivered at a similar rate, the latter generally somewhat more slowly. According to exploratory plant tests with rye grass (*Lolium perenne*) the nutrient delivery in soil is about three to four times as slow as the above tests in water indicate. Fertilizers coated according to this invention are in part effective throughout the entire period of growth, i.e., six to nine months.

The following examples will further illustrate the invention; parts and percentages given in the examples are units of weight unless otherwise stated.

Figure 4:
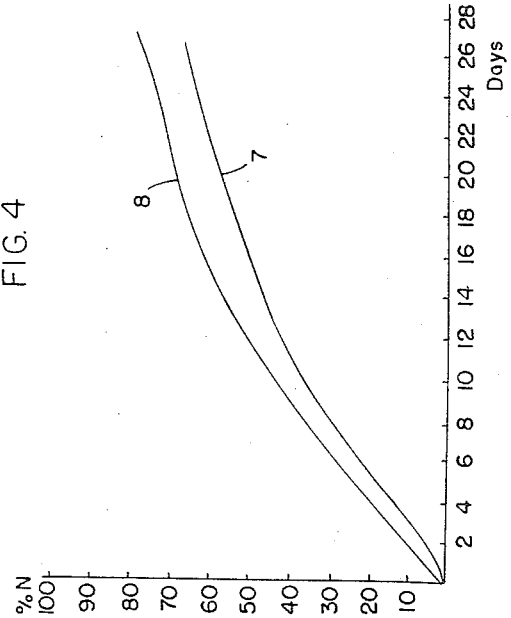
Figure 1:
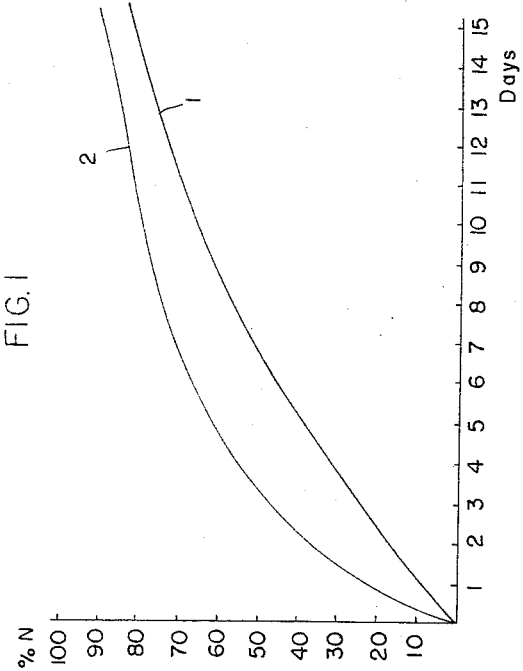
Figure 3:
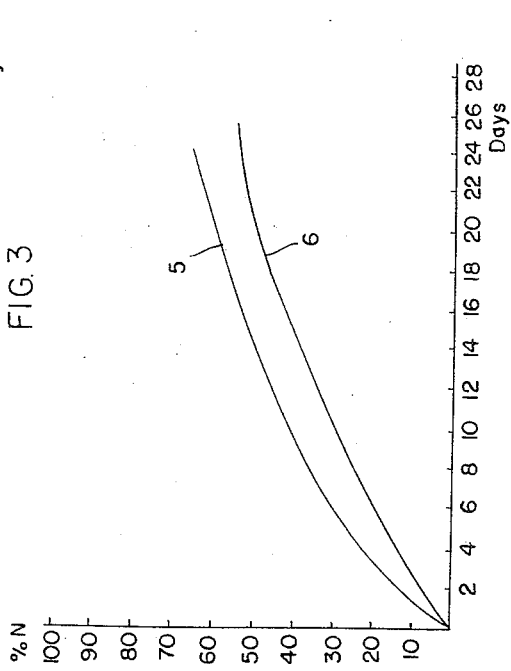

In the examples the amount of nitrogen released, which is the measure of nutrient delivery, was determined by a conventional method. The values obtained are plotted against time (in days) in FIGURES 1 to 8 of the accompanying drawings.

Example 1

940 parts of a granular multinutrient fertilizer $(N:P_2O_5:K_2O=15:15:15)$ having a granule diameter of 2 to 4 mm. is placed in a power-operated horizontal revolving drum. The granulate is preheated to 110° to 120° C. by blowing in hot air. 60 parts of oily polybutadiene (mean molecular weight about 4000, viscosity 4,630 cp. measured at 25° C.) is then introduced and the drum rotated while blowing in hot air. The oily polybutadiene distributes itself uniformly over the granulate and forms a coating which is not tacky after sixty to seventy minutes. The coated fertilizer is cooled with cold air. It is kept for three days before the nutrient delivery is determined. The course of the nutrient delivery with respect to time is shown in curve 1 in FIGURE 1 of the accompanying drawing.

Example 2

960 parts of a granular multinutrient fertilizer $(N:P_2O_5:K_2O=13:13:21)$ having a granule diameter of 2 to 4 mm. is placed in a horizontal revolving drum. The granulate is heated to 110° to 120° C. with hot air. 40 parts of the polybutadiene used in Example 1 is added and then the drum is rotated for fifty to sixty minutes, the said temperature being maintained by blowing in hot air. Fertilizer granules which are almost uniformly coated are obtained. These are cooled and left for three days. Nutrient delivery may be seen from curve 2 of FIGURE 1.

Example 3

9500 parts of a granular multinutrient fertilizer $(N:P_2O_5:K_2O=12:12:20)$ having a granule diameter of 2 to 4 mm. is placed in an inclined revolving drum. The granulate is heated to 130° to 140° C. with hot air and 500 parts of polyene polymer from 80% of butadiene and 20% of styrene (mean molecular weight about 10,000, viscosity 7000 cp. measured at 30° C.) is added. The polyene polymer immediately spreads itself over the surface of the fertilizer granules. After a period of eighty to ninety minutes at a temperature of the material of 130° C. during which the drum rotates slowly, a fertilizer granulate uniformly coated with 5% of the polyene polymer can be withdrawn from the drum. The product, which is still slightly tacky, is allowed to cool and is kept for three days. Nutrient delivery is as is shown in curve 3 of FIGURE 2.

Example 4

940 parts of prilled urea having a granule diameter of about 1 mm. is heated in a revolving drum to 110° to 120° C. by means of hot air as described in Example 1. 60 parts of a polybutadiene (viscosity 8000 to 12,000 cp. measured at 80° C.; mean molecular weight 32,000) prepared using sodium as polymerization catalyst is then introduced. After a residence period of 2 to 2½ hours in the rotating drum heated with hot air, an almost uniformly coated urea granulate is obtained which is cooled and stored. Nutrient delivery may be seen from curve 4 in FIGURE 2.

Example 5

The procedure of Example 1 is repeated but using as coating agent a pure 1,2-polybutadiene having a mean molecular weight of about 6000 to which 1% of its weight of cobalt naphthenate and 0.1% of its weight of dimethylaniline have been added prior to application. Nutrient delivery from the finished coated fertilizer may be seen from curve 5 of FIGURE 3.

Example 6

The procedure of Example 1 is repeated but using as coating agent a polyene polymer prepared from 80 parts of butadiene, 14 parts of styrene and 6 parts of α-methylstyrene by the process of U.S. Patent 3,070,574 and which has a mean molecular weight of about 5000. Control of the nutrient delivery with respect to time is reproduced in curve 6 of FIGURE 3.

Example 7

The procedure of Example 1 is repeated but using as coating agent a polyene polymer consisting of 90 parts of butadiene and 10 parts of α-methylstyrene which has been prepared by the process of U.S. Patent 3,070,574, has a mean molecular weight of about 6000 and to which 1% of its weight of cobalt naphthenate has been added prior to application to the fertilizer granulate. Nutrient delivery testing of the coated fertilizer in water gives curve 7 in FIGURE 4.

Example 8

The procedure of Example 1 is repeated but using as coating agent a polyene polymer prepared from 70 parts of butadiene, 20 parts of styrene and 10 parts of α-methylstyrene by the process of U.S. Patent 3,070,574 and which has a mean molecular weight of about 3000. Nutrient delivery from the finished coated fertilizer is shown in curve 8 of FIGURE 4.

Example 9

The procedure of Example 1 is repeated but using as coating agent a commercially available polyene polymer consisting of 62 parts of butadiene and 38 parts of acrylonitrile and having a K-value of 32 (H. Fikentscher, Cellulose-chemie, 13 (1932), 58–64). A well coated fertilizer granulate having a slightly tacky coating is obtained after sixty to seventy minutes.

Example 10

94 parts of a granular multinutrient fertilizer $(N:P_2O_5:K_2O=13:13:21)$ having a granule diameter of 2 to 4 mm. is placed in an inclined revolving drum. The granulate is preheated to 110° to 120° C. by blowing in hot air. Then 1 part of a reactive polybutadiene having a molecular weight of about 4000 (which has been isomerized as described above with a heavy metal complex) is sprayed onto the fertilizer granulate and the drum is rotated while blowing in hot air. After three minutes, the polymer, which at first is oily, has formed a non-tacky solid coating on the granules. In a similar way, 1 part of reactive butadiene is applied in each of five separate treatments and cured by hot air treatment. After a total time of eighteen minutes, a uniformly coated granulate is obtained containing 6% of its weight of polymer as a coating. The retardation of nutrient delivery in water may be seen from curve 9 in FIGURE 5.

Example 11

Following the procedure of Example 10, 94 parts of a granular multinutrient fertilizer $(N:P_2O_5:K_2O=12:12:20)$ having a granule diameter of 2 to 4 mm. is heated to 110° to 120° C., 2 parts of polyene polymer from 80% of butadiene and 20% of styrene which has been made reactive by isomerization (mean molecular weight about 10,000) is allowed to flow in and the material is treated with hot air. After four minutes, a solid non-tacky coating has formed on the fertilizer granules. Another twice, 2 parts of reactive polyene polymer is added in the same way. After a total of twelve minutes, a granulated fertilizer uniformly coated with 6% of plastic may be discharged from the drum. The retardation of nutrient delivery may be seen from curve 10 in FIGURE 5.

Example 12

Following the procedure of Example 10, 94 parts of a prilled urea granulate having a granule size of about 1 mm. diameter is coated in a revolving drum at 110° to 120° C. three times, each time with 2 parts of a polybutadiene which has been prepared by polymerization using sodium as polymerization catalyst and which has been isomerized by a method as described above (mean molecular weight about 32,000). After the material has remained in the drum for three times four minutes, a completely and uniformly coated urea granulate has been formed. The nutrient delivery retardation in water is shown in curve 11 in FIGURE 6.

Example 13

Following the procedure of Example 10, 94 parts of a granular multinutrient fertilizer ($N:P_2O_5:K_2O = 13:13:21$) having a granule diameter of 2 to 4 mm. is heated to 110° to 120° C., 2 parts of a polyene polymer prepared from 80 parts of butadiene, 14 parts of styrene and 6 parts of $\alpha$-methylstyrene according to U.S. Patent 3,070,574 and has a mean molecular weight of about 5000, and which has been made reactive by isomerization, is allowed to flow in, and the addition repeated twice more, each time with another 2 parts of the polymer, the material being treated with hot air for eight to ten minutes after each addition. The good retardation of the nutrient delivery may be seen from curve 12 in FIGURE 6.

Example 14

Following the procedure of Example 13, 94 parts of a multinutrient fertilizer ($N:P_2O_5:K_2O = 13:13:21$) is coated 3 times, each time with 2 parts of a polyene polymer which has been prepared from 90 parts of butadiene and 10 parts of $\alpha$-methylstyrene by the process of U.S. Patent 3,070,574, which has a mean molecular weight of about 6000 and which has been made reactive by isomerization. The coated fertilizer shows in the water test a nutrient delivery as indicated in curve 13 in FIGURE 7.

Example 15

The procedure of Example 13 is followed and 6 parts of a polyene polymer prepared from 70 parts of butadiene, 20 parts of styrene and 10 parts of $\alpha$-methylstyrene by the process of U.S. Patent 3,070,574, which has a mean molecular weight of about 3000 and which has been made reactive by isomerization is used as coating agent for 94 parts of fertilizer. The coated fertilizer has the nutrient delivery in the water test which is indicated in curve 14 in FIGURE 7.

Example 16

The procedure of Example 13 is followed and the coating agent used is pure 1,2-polybutadiene which has been made reactive by isomerization and has a mean molecular weight of about 6000. The nutrient delivery in the water test is shown in curve 15 in FIGURE 7.

Example 17

The procedure of Example 13 is followed for coating 94 parts of a multinutrient fertilizer ($N:P_2O_5:K_2O = 13:13:21$)

with 6 parts of a commercially available polyene polymer consisting of 62 parts of butadiene and 38 parts of acrylonitrile and having a K-valve of 32 (H. Fikentscher, ibid). A hard glossy coating is obtained on the fertilizer granulate.

Example 18

Following the procedure of Example 10, a granulated multinutrient fertilizer ($N:P_2O_5:K_2O = 13:13:21$; granule diameter 2 to 4 mm.) is coated with a polybutadiene which has been isomerized by a method as described above (mean molecular weight about 4000) and to which prior to processing 0.01% by weight of cyclohexanone peroxide has been added. The following amounts of polybutadiene are applied in ten experiments:

| Number of experiment | Parts of fertilizer | Parts of polybutadiene |
|---|---|---|
| (a) | 99 | 1 |
| (b) | 98 | 2 |
| (c) | 97 | 3 |
| (d) | 96 | 4 |
| (e) | 95 | 5 |
| (f) | 94 | 6 |
| (g) | 93 | 7 |
| (h) | 92 | 8 |
| (i) | 91 | 9 |
| (k) | 90 | 10 |

The retardation of nutrient delivery in water achieved with the products of this series of experiments is shown by curves (a) to (k) in FIGURE 8.

We claim:

1. A process for the production of slow-acting fertilizers by coating heated fertilizer particles with drying oily substances and drying the coating, which comprises applying directly to said heated fertilizer from a solvent-free system from 2 to 20% by weight of a drying oily polymer at least 50% by weight of which consists of at least one monomer selected from the group consisting of butadiene, isoprene, piperylene, cyclopentadiene, cyclohexadiene-(1,3), 3-methylheptatriene-(1,4,6) and n-decatriene-(1,5,9) and drying the coating.

2. A process as claimed in claim 1 wherein the drying of the oily polyene polymers is carried out in the presence of drying accelerators.

3. A process as claimed in claim 1 wherein the fertilizer is preheated to a temperature of 50 to 160° C. and the coating of the fertilizer and the drying of the coated fertilizer are carried out at a temperature of 50 to 160° C.

4. A process for the production of slow-acting fertilizers by coating heated fertilizer particles with drying oily substances and drying the coating which comprises directly applying to the heated fertilizer from a solvent-free system from 2 to 20% by weight of an oily polymer having a mean molecular weight of from 500–40,000 which has been made reactive and which has been prepared from at least one of the monomers from the group consisting of butadiene, isoprene, piperylene, cyclopentadiene, cyclohexadiene-(1,3), 3-methylheptatriene-(1,4,6) and n-decatriene-(1,5,9) and drying the coating.

5. A process for the production of slow-acting fertilizers by coating heated fertilizer particles with drying oily substances and drying the coating, which comprises applying directly to said heated fertilizers from a solvent-free system from 2 to 20% by weight of a drying oily copolymer obtained by polymerizing a mixture containing butadiene and styrene, at least 50% by weight of said copolymer consisting of butadiene units.

6. A process for the production of slow-acting fertilizers by coating heated fertilizer particles with drying oily substances and drying the coating, which comprises applying directly to said heated fertilizers from a solvent-free system from 2 to 20% by weight of a drying oily block copolymer obtained by polymerizing a mixture containing butadiene and $\alpha$-methylstyrene, at least 50% by weight of said copolymer consisting of butadiene units.

7. A process for the production of slow-acting fertilizers by coating heated fertilizer particles with drying oily substances and drying the coating, which comprises applying directly to said heated fertilizer from a solvent-free system from 2 to 20% by weight of a drying oily block-copolymer, which has been rendered reactive, obtained by polymerizing a mixture containing butadiene and $\alpha$-methylstyrene, at least 50% by weight of said copolymer consisting of butadiene units.

8. A process for the production of slow-acting fertilizers by coating heated fertilizer particles with drying oily substances and drying the coating which comprises applying directly to said heated fertilizers from a solvent-free system from 2 to 20% by weight of a drying oily polymer, at least 50% by weight of which consists of at least one monomer from the group consisting of butadiene, isoprene, piperylene, cyclopentadiene, cyclohexadiene-(1,3), 3-methylheptatriene-(1,4,6) and n-decatriene-(1,5,9) and which has been isomerized after addition of a catalyst selected from the group consisting of metals of groups VIB, VIIB and VIII of the Periodic System of Elements and compounds of these metals in which the metal is zerovalent, at elevated temperature, and drying the coating.

9. A process as claimed in claim 8 wherein a polyene polymer is used which has a mean molecular weight of from 500 to 40,000.

10. A process for the production of slow-acting fertilizers by coating heated fertilizer particles with drying oily substances and drying the coating, which comprises applying directly to said heated fertilizers from a solvent free system from 2 to 20% by weight of a drying oily copolymer obtained by polymerizing a mixture containing butadiene, and styrene, at least 50% by weight of said copolymer consisting of butadiene units and which has been isomerized after addition of a catalyst selected from the group consisting of metals of groups VIB, VIIB and VIII of the Periodic System of Elements and compounds of these metals in which the metal is zerovalent, at elevated temperature, and drying the coating.

11. A process for the production of slow-acting fertilizers by coating heated fertilizer particles with drying oily substances and drying the coating, which comprises applying directly to said heated fertilizers from a solvent-free system from 2 to 20% by weight of a drying oily block copolymer obtained by polymerizing a mixture containing butadiene and α-methylstyrene, at least 50% by weight of said copolymer consisting of butadiene units and which has been isomerized after addition of a catalyst selected from the group consisting of metals of groups VIB, VIIB and VIII of the Periodic System of Elements and compounds of these metals in which the metal is zerovalent, at elevated temperature, and drying the coating.

12. Slow-acting fertilizers which comprise fertilizer particles coated with a dried coating, said dried coating being formed essentially from 2 to 20% by weight of a drying oily polymer at least 50% by weight of which consists of at least one monomer selected from the group consisting of butadiene, isoprene, piperylene, cyclopentadiene, cyclohexadiene-(1,3), 3-methylheptatriene-(1,4,6) and n-decatriene-(1,5,9).

13. Slow-acting fertilizers which comprise fertilizer particles coated with a dried coating, said dried coating being formed essentially from 2 to 20% by weight of a drying oily copolymer obtained by polymerizing a mixture containing butadiene and styrene, said copolymer containing at least 50% by weight of butadiene units.

14. Slow-acting fertilizers which comprise fertilizer particles coated with a dried coating, said dried coating being formed essentially from 2 to 20% by weight of a drying oily block copolymer obtained by polymerizing a mixture containing butadiene and α-methylstyrene, said copolymer containing at least 50% by weight of butadiene units.

References Cited
UNITED STATES PATENTS

| | | | |
|---|---|---|---|
| 2,500,770 | 3/1950 | Pierce | 99—143 |
| 3,158,462 | 11/1964 | Wilson | 71—4 |
| 3,223,518 | 12/1965 | Hansen | 71—64 |

DONALL H. SYLVESTER, *Primary Examiner.*

S. LEON BASHORE, *Examiner.*

R. BAJEFSKY, *Assistant Examiner.*